(12) United States Patent
Golitschek Edler von Elbwart et al.

(10) Patent No.: US 10,959,191 B2
(45) Date of Patent: Mar. 23, 2021

(54) TRANSMIT POWER CONTROL COMMAND FOR TRANSMISSION POWER ADJUSTMENT

(71) Applicant: Lenovo (Singapore) PTE. LTD., New Tech Park (SG)

(72) Inventors: Alexander Johann Maria Golitschek Edler von Elbwart, Darmstadt (DE); Joachim Loehr, Wiesbaden (DE); Prateek Basu Mallick, Langen (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/146,471

(22) Filed: Sep. 28, 2018

(65) Prior Publication Data

US 2019/0098585 A1    Mar. 28, 2019

Related U.S. Application Data

(60) Provisional application No. 62/564,803, filed on Sep. 28, 2017.

(51) Int. Cl.
| | | |
|---|---|---|
| *H04W 72/04* | (2009.01) | |
| *H04W 52/36* | (2009.01) | |
| *H04B 7/06* | (2006.01) | |
| *H04W 52/14* | (2009.01) | |
| *H04W 52/58* | (2009.01) | |
| *H04W 52/48* | (2009.01) | |

(52) U.S. Cl.
CPC ........ *H04W 52/362* (2013.01); *H04B 7/0619* (2013.01); *H04W 52/146* (2013.01); *H04W 52/48* (2013.01); *H04W 52/58* (2013.01)

(58) Field of Classification Search
CPC . H04W 52/362; H04W 52/146; H04W 52/48; H04W 52/58; H04B 7/0619
See application file for complete search history.

(56) References Cited

U.S. PATENT DOCUMENTS

| 9,674,789 | B1 * | 6/2017 | Govindswamy | ...... H04W 52/48 |
| 2007/0060167 | A1 * | 3/2007 | Damnjanovic | ....... H04W 52/02 455/450 |
| 2007/0173278 | A1 * | 7/2007 | Yoon | ................... H04W 52/146 455/522 |

(Continued)

FOREIGN PATENT DOCUMENTS

WO    2007078160 A1    7/2017

OTHER PUBLICATIONS

International Searching Authority, "Notification of Transmittal of the International Search Report and the Written Opinion of the International Searching Authority, or the Declaration", PCT/IB2018/001197, dated Feb. 4, 2019, pp. 1-11.

*Primary Examiner* — Edan Orgad
*Assistant Examiner* — Malick A Sohrab
(74) *Attorney, Agent, or Firm* — Kunzler Bean & Adamson (57) ABSTRACT

Apparatuses, methods, and systems are disclosed for receiving a transmit power control command for transmission power adjustment. One method includes monitoring a feedback channel. The feedback channel includes: feedback information corresponding to a data transmission from a remote unit to a network unit; and a transmit power control command including information for the remote unit to adjust a transmission power for subsequent data transmissions to the network unit.

20 Claims, 6 Drawing Sheets

(56) References Cited

U.S. PATENT DOCUMENTS

| | | | | |
|---|---|---|---|---|
| 2013/0051341 A1* | 2/2013 | Suzuki | ............... | H04L 5/0005 |
| | | | | 370/329 |
| 2016/0330011 A1* | 11/2016 | Lee | ............... | H04L 5/006 |
| 2016/0337984 A1* | 11/2016 | Takeda | ............... | H04W 52/08 |
| 2017/0048885 A1* | 2/2017 | Lampinen | ............... | H04W 4/70 |
| 2020/0128621 A1* | 4/2020 | Chang | ............... | H04L 1/1819 |

* cited by examiner

| Feedback Information<br>402 | TPC Command<br>404 |
|---|---|

TRANSMIT POWER CONTROL COMMAND FOR TRANSMISSION POWER ADJUSTMENT

CROSS-REFERENCE TO RELATED APPLICATIONS

This application claims priority to U.S. Patent Application Ser. No. 62/564,803 entitled "TPC FOR PUSCH IN AUTONOMOUS UPLINK TRANSMISSIONS" and filed on Sep. 28, 2017 for Alexander Johann Maria Golitschek Edler von Elbwart, which is incorporated herein by reference in its entirety.

FIELD

The subject matter disclosed herein relates generally to wireless communications and more particularly relates to transmit power control command for transmission power adjustment.

BACKGROUND

The following abbreviations are herewith defined, at least some of which are referred to within the following description: Third Generation Partnership Project ("3GPP"), $5^{th}$ Generation ("5G"), Positive-Acknowledgment ("ACK"), Access Point ("AP"), Autonomous Uplink ("AUL"), Binary Phase Shift Keying ("BPSK"), Buffer Status Report ("BSR"), Carrier Aggregation ("CA"), Clear Channel Assessment ("CCA"), Cyclic Delay Diversity ("CDD"), Code Division Multiple Access ("CDMA"), Control Element ("CE"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMIRS"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Services ("GPRS"), Guard Period ("GP"), Global System for Mobile Communications ("GSM"), Hybrid Automatic Repeat Request ("HARQ"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Long Term Evolution ("LTE"), Multiple Access ("MA"), Medium Access Control ("MAC"), Multimedia Broadcast Multicast Services ("MBMS"), Modulation and Coding Scheme ("MCS"), Machine Type Communication ("MTC"), massive MTC ("mMTC"), Multiple Input Multiple Output ("MIMO"), Maximum Power Reduction ("MPR"), Multi User Shared Access ("MUSA"), Narrowband ("NB"), Negative-Acknowledgment ("NACK") or ("NAK"), Next Generation Node B ("gNB"), New Data Indicator ("NDP"), Non-Orthogonal Multiple Access ("NOMA"), New Radio ("NR"), Orthogonal Frequency Division Multiplexing ("OFDM"), Open-Loop ("OL"), Power Angular Spectrum ("PAS"), Power Control ("PC"), Primary Cell ("PCell"), Physical Broadcast Channel ("PBCH"), Physical Downlink Control Channel ("PDCCH"), Packet Data Convergence Protocol ("PDCP"), Physical Downlink Shared Channel ("PDSCH"), Pattern Division Multiple Access ("PDMA"), Physical Hybrid ARQ Indicator Channel ("PHICH"), Power Headroom ("PH"), Power Headroom Report ("PHR"), Physical Layer ("PHY"), Physical Random Access Channel ("PRACH"), Physical Resource Block ("PRB"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Radio Access Network ("RAN"), Radio Access Technology ("RAT"), Resource Block Assignment ("RBA"), Radio Resource Control ("RRC"), Random Access Procedure ("RACH"), Random Access Response ("RAR"), Radio Link Control ("RLC"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Redundancy Version ("RV"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), Signal-to-Interference-Plus-Noise Ratio ("SINR"), System Information Block ("SIB"), Synchronization Signal ("SS"), Scheduled Uplink ("SUL"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX").

In certain wireless communications networks, a transmit power control command for transmission power adjustment may be used. In such networks, the transmit power control command may indicate to a remote unit how to adjust its transmission power.

BRIEF SUMMARY

Methods for receiving a TPC command for transmission power adjustment are disclosed. Apparatuses and systems also perform the functions of the apparatus. One embodiment of a method includes monitoring a feedback channel. In such an embodiment, the feedback channel includes: feedback information corresponding to a data transmission from a remote unit to a network unit; and a transmit power control command including information for the remote unit to adjust a transmission power for subsequent data transmissions to the network unit.

One apparatus for receiving a TPC command for transmission power adjustment includes a processor that monitors a feedback channel. In such an embodiment, the feedback channel includes: feedback information corresponding to a data transmission from a remote unit to a network unit; and a transmit power control command including information for the remote unit to adjust a transmission power for subsequent data transmissions to the network unit.

One method for transmitting a TPC command for transmission power adjustment includes transmitting a feedback channel. In such an embodiment, the feedback channel includes: feedback information corresponding to a data transmission from a remote unit to a network unit; and a transmit power control command including information for the remote unit to adjust a transmission power for subsequent data transmissions to the network unit.

One apparatus for transmitting a TPC command for transmission power adjustment includes a transmitter that transmits a feedback channel. In such an embodiment, the feedback channel includes: feedback information corresponding to a data transmission from a remote unit to a network unit; and a transmit power control command including information for the remote unit to adjust a transmission power for subsequent data transmissions to the network unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
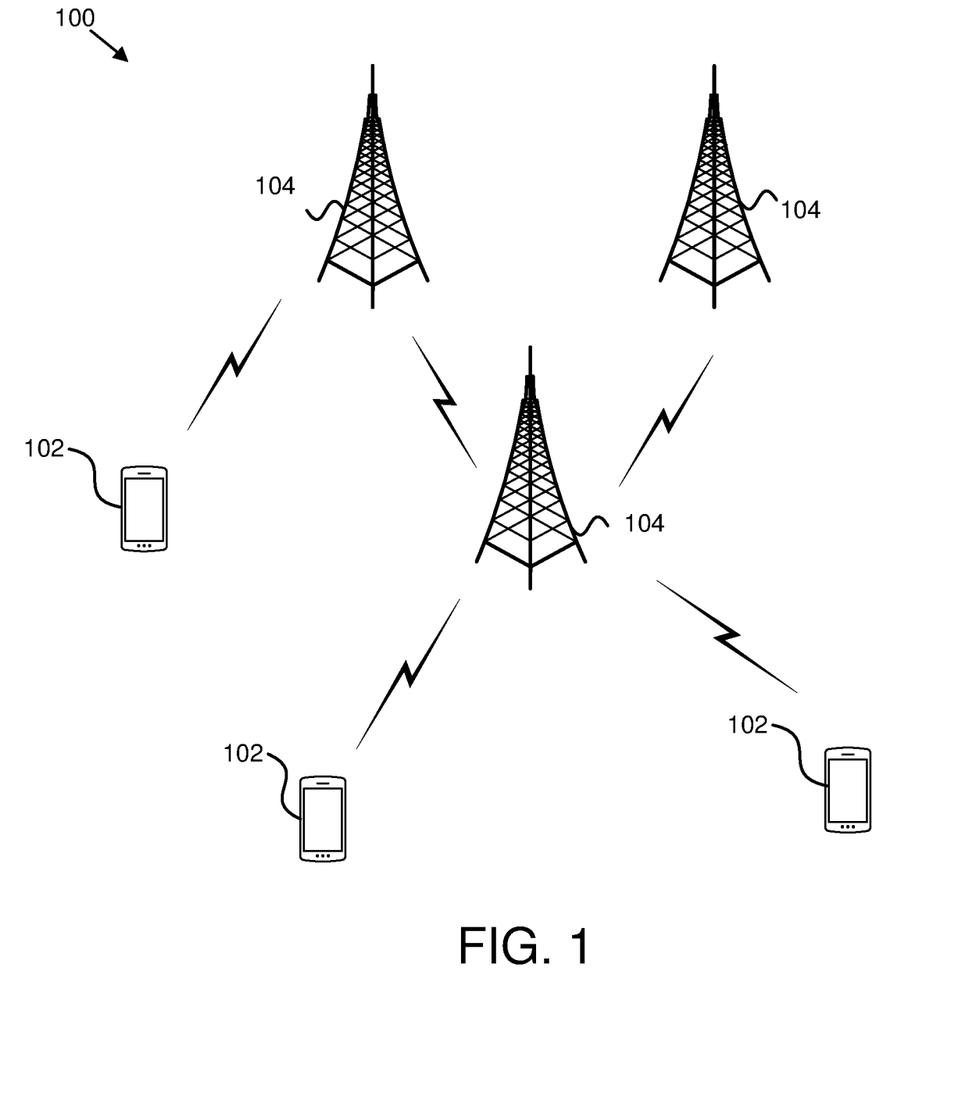
FIG. 1 is a schematic block diagram illustrating one embodiment of a wireless communication system for transmitting and/or receiving a TPC command for transmission power adjustment.

FIG. 1 depicts an embodiment of a wireless communication system 100 for transmitting and/or receiving a TPC command for transmission power adjustment. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may be used for receiving a TPC command for transmission power adjustment. The remote unit 102 may monitor a feedback channel. In such an embodiment, the feedback channel may include: feedback information corresponding to a data transmission from the remote unit 102 to a network unit 104; and a transmit power control command including information for the remote unit 102 to adjust a transmission power for subsequent data transmissions to the network unit 104. Accordingly, the remote unit 102 may be used for receiving a TPC command for transmission power adjustment.

Figure 2:
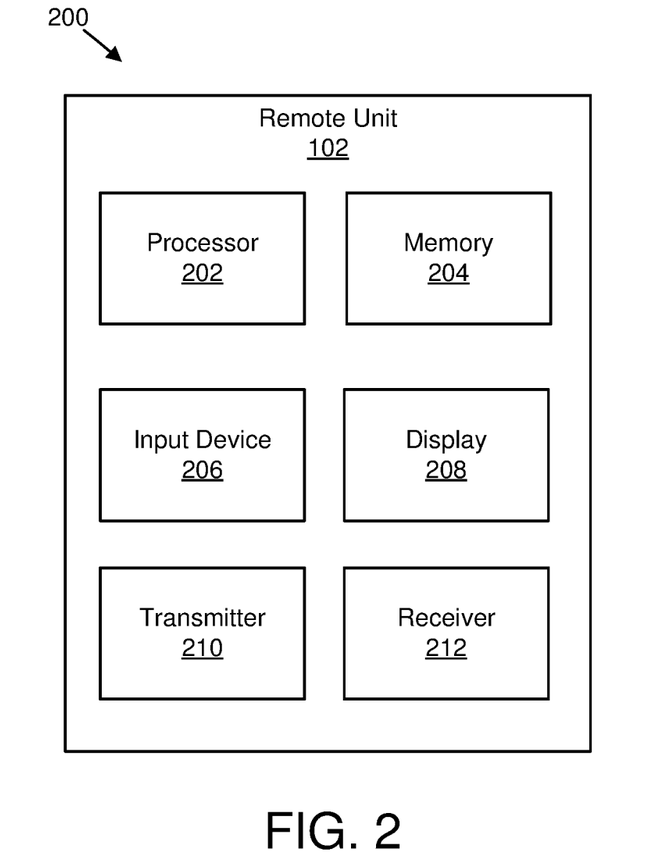
FIG. 2 is a schematic block diagram illustrating one embodiment of an apparatus that may be used for receiving a TPC command for transmission power adjustment.

In certain embodiments, a network unit 104 may be used for transmitting a TPC command for transmission power adjustment. In some embodiments, the network unit 104 may transmit a feedback channel. In such an embodiment, the feedback channel may include: feedback information corresponding to a data transmission from a remote unit 102 to the network unit 104; and a transmit power control command including information for the remote unit 102 to adjust a transmission power for subsequent data transmissions to the network unit 104. Accordingly, the network unit 104 may be used for transmitting a TPC command for transmission power adjustment FIG. 2 depicts one embodiment of an apparatus 200 that may be used for receiving a TPC command for transmission power adjustment. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may monitor a feedback channel. In such embodiments, the feedback channel may include: feedback information corresponding to a data transmission from a remote unit 102 to a network unit 104; and a transmit power control command including information for the remote unit 102 to adjust a transmission power for subsequent data transmissions to the network unit 104. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives a feedback channel. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
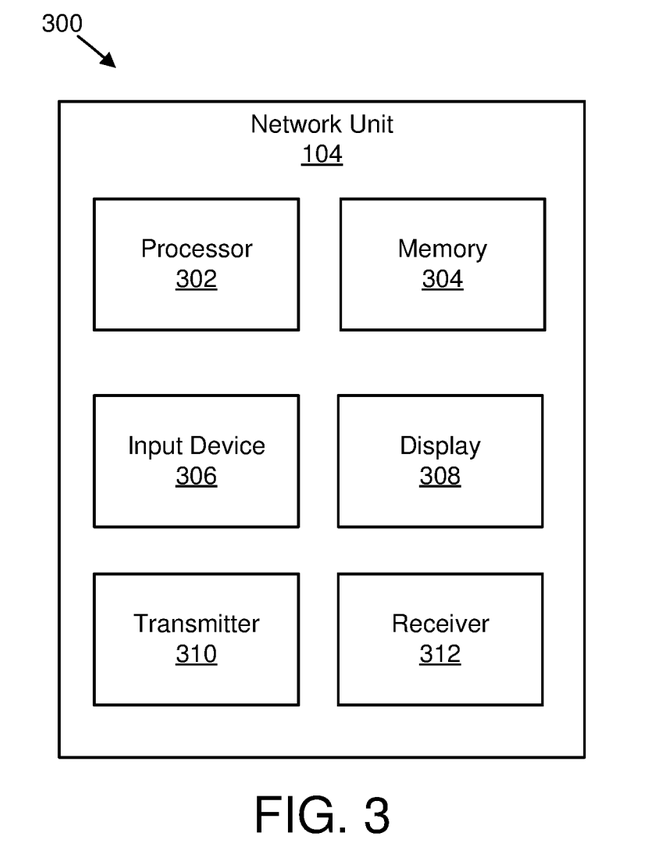
FIG. 3 is a schematic block diagram illustrating one embodiment of an apparatus that may be used for transmitting a TPC command for transmission power adjustment.

FIG. 3 depicts one embodiment of an apparatus 300 that may be used for transmitting a TPC command for transmission power adjustment. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may transmit a feedback channel. In such an embodiment, the feedback channel includes: feedback information corresponding to a data transmission from a remote unit 102 to a network unit 104; and a transmit power control command including information for the remote unit 102 to adjust a transmission power for subsequent data transmissions to the network unit 104. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In AUL transmissions, a remote unit 102 may only receive DCI to enable and/or disable AUL. The DCI may include parameters for uplink transmissions such as RBA and/or MCS. Thereafter, any AUL transmissions are then done without new DCI whenever the remote unit 102 can access a channel and has data in its transmit buffer.

As may be appreciated, because relevant information for AUL is conveyed by an activation DCI, link adaptation such as MCS adjustment, power control, RBA changes may only be possible by a new activation (or reactivation) DCI. In certain embodiments, TPC may be useful to react to fluctuating channel conditions that may be addressed by a different transmit power instead of MCS or RBA adaptation.

In various configurations, a "TPC for PUSCH" field that is available in a grant DCI for SUL transmissions cannot be used because of operational characteristics of grant-free AUL transmission. In certain configurations, TPC commands as provided in LTE via DCI formats 3/3A or as provided in NR via DCI formats 2_2/2_3 cannot be transmitted on an unlicensed carrier because an unlicensed carrier doesn't carry a common search space (or in other words, a remote unit 102 doesn't monitor common search space and corresponding DCI formats on an unlicensed carrier). In some configurations, TPC commands for an unlicensed carrier as provided in LTE via DCI formats 3/3A or as provided in NR via DCI formats 2_2/2_3 cannot be conveyed by a licensed carrier, because DCI formats 3/3A in LTE or DCI formats 2_2/2_3 in NR do not support any cross-carrier indication or cross-carrier TPC adjustment.

In some embodiments, an SUL grant may be sent to a remote unit 102. The SUL grant may include a "TPC for PUSCH field." In such embodiments, a PDCCH resource may be used to convey the UL grant. In various embodiments, an AUL transmission may be reactivated by a new DCI sent to a remote unit 102. The AUL transmission may include a "TPC for PUSCH field." In such embodiments, it may be implied that the TPC for PUSCH field is not used and/or usable as a virtual CRC for protection against AUL false activations.

In certain embodiments, transmission of DCI formats 3/3A or DCI formats 2_2/2_3 may be enabled on an unlicensed carrier. In such embodiments, introduction and monitoring of a common search space on an unlicensed carrier may be used. In some embodiments, cross-carrier signaling of TPC commands via LTE DCI formats 3/3A or NR DCI formats 2_2/2_3 conveyed on a licensed carrier may be enabled. In such embodiments, an enhancement of LTE DCI formats 3/3A or NR DCI formats 2_2/2_3 as well as corresponding RRC configuration enhancements may be used.

In various embodiments, a "TPC for PUSCH" field may be conveyed together with (e.g., as part of) a HARQ-ACK feedback channel.

Figure 4:
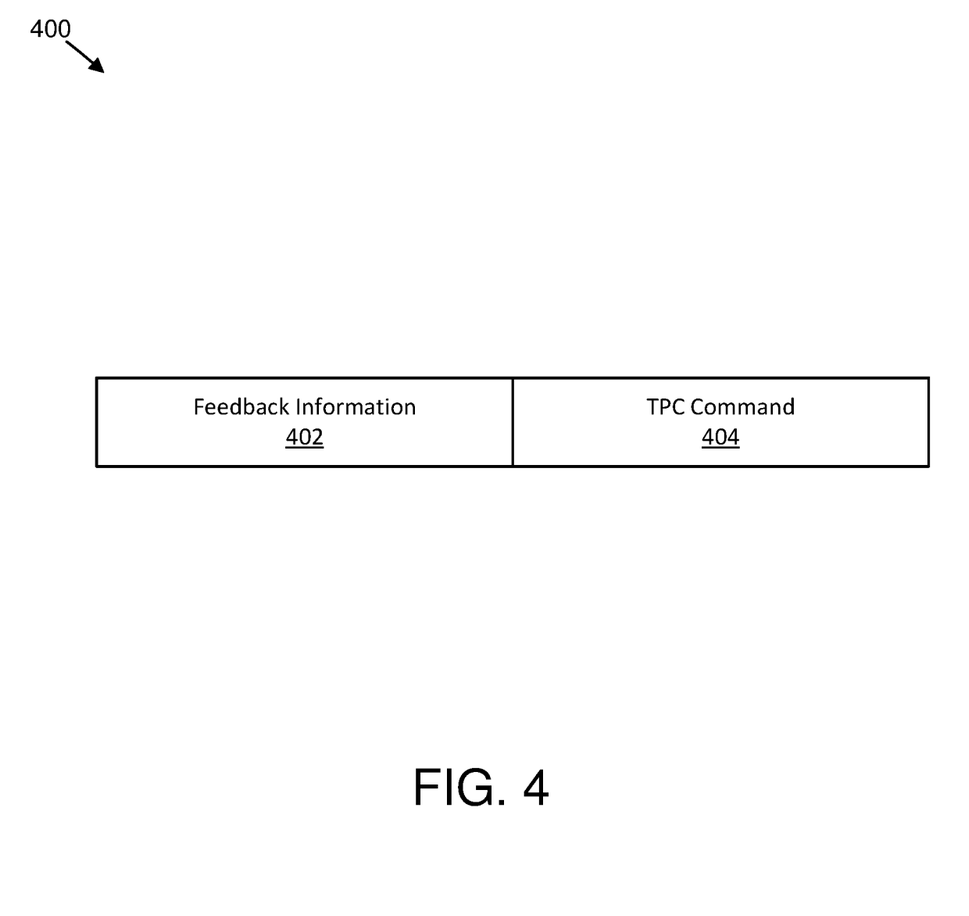
FIG. 4 is a schematic block diagram illustrating one embodiment of a feedback channel.

FIG. 4 is a schematic block diagram illustrating one embodiment of a feedback channel 400 (e.g., a HARQ-ACK feedback channel). Specifically, the feedback channel 400 includes feedback information 402 (e.g., HARQ-ACK feedback) and a TPC command 404 (e.g., TPC command for PUSCH). The TPC command 404 may include any suitable number of bits that can transmit the TPC command effectively. For example, the TPC command 404 may include one bit, two bits, or more bits. In one embodiment, the TPC command 404 includes one bit. In such an embodiment, if the bit is "0," the bit may indicate to not change the transmission power, or to reduce the transmission power (e.g., transmission power step down). Moreover, in such an embodiment, if the bit is "1," the bit may indicate to increase the transmission power (e.g., transmission power step up), or to not change the transmission power. In another embodiment, the TPC command 404 includes two bits. In such an embodiment, the two bits may be used to indicate a transmission power step up (e.g., increase in transmission power), a transmission power step down (e.g., decrease in transmission power), no change of the transmission power, and/or a transmission power step up (or step down) with a different step size than indicated by another two-bit TPC command value.

Since AUL transmissions could be transmitted for any of a number of configurable HARQ processes, a remote unit 102 may indicate via UCI for which HARQ ID a PUSCH is transmitted so that a network unit 104 can perform soft buffer combining and/or decoding. The UCI may also include an NDI field and an RV field.

In some embodiments, AUL supports transmission (e.g., a first transmission of a transport block) and retransmission (e.g., transmissions after the first transmission of the same transport block). Therefore, some HARQ-ACK feedback mechanism from a network unit 104 to a remote unit 102 may be used that is similar to PHICH in licensed carriers. In various embodiments, a new HARQ-ACK feedback channel (e.g., the feedback channel 400) is transmitted on an unlicensed carrier, and, therefore, there may be no strict timing relation between a PUSCH and a corresponding HARQ- ACK feedback. In some embodiments, the new HARQ-ACK feedback channel may convey multiple HARQ-ACK (e.g., for multiple recent AUL transmissions).

In certain embodiments, the new HARQ-ACK feedback channel may support HARQ-ACK (e.g., the feedback information 402) for up to 16 HARQ processes per remote unit 102, and may include one or two additional TPC bits (e.g., as in LTE DCI formats 3/3A, the TPC command 404). The additional TPC bits may add the TPC command 404 without much overhead.

In various embodiments, such as due to access to an unlicensed band, it may be possible for UL transmissions to collide such that a network unit 104 may not be able to detect an AUL transmission, even though a remote unit 102 transmitted the AUL after successfully completing a clear channel assessment. This may occur if a hidden node has transmitted at a same time as the remote unit 102, without the remote unit 102 noticing the hidden node. Such an occurrence may result in the network unit 104 receiving substantial noise and/or interference from the hidden node, so that the network unit 104 is not aware of the AUL transmission. As a consequence, the network unit 102 may be unaware that the remote unit 102 expects a transmission of a HARQ feedback channel. In such embodiments, regardless of the consequences for channel access (e.g., contention window adjustment), the remote unit 102 may increase its transmit power to make its transmissions more robust against possible hidden node transmission. Thus, in certain embodiments, a remote unit 102 may interpret a lack of a HARQ feedback channel within a defined time-window after an AUL transmission as being equivalent to a "transmit power step up" command.

In some embodiments, a remote unit 102 may receive a TPC command 404 within a HARQ feedback command at the same time as receiving an uplink grant including a TPC field for a SUL transmission. In certain embodiments in which the remote unit 102 receives the TPC command 404 and the TPC field in an UL grant, the remote unit 102 may process both TPC commands simultaneously (e.g., effectively making two adjustments at the same time). In other embodiments in which the remote unit 102 receives the TPC command 404 and the TPC field in an UL grant, the remote unit 102 may only apply the TPC command received in the UL grant. In such embodiments, the remote unit may apply the TPC command received in the UL grant because the TPC command in the UL grant may be two bits, while the TPC command 404 in the HARQ feedback channel may be only one bit. As may be appreciated, a two bit TPC command may have better granularity and should therefore take precedence over a one bit TPC command. Accordingly, the TPC command 404 may be dropped and/or ignored if a two bit TPC command is received in an UL grant.

Figure 5:
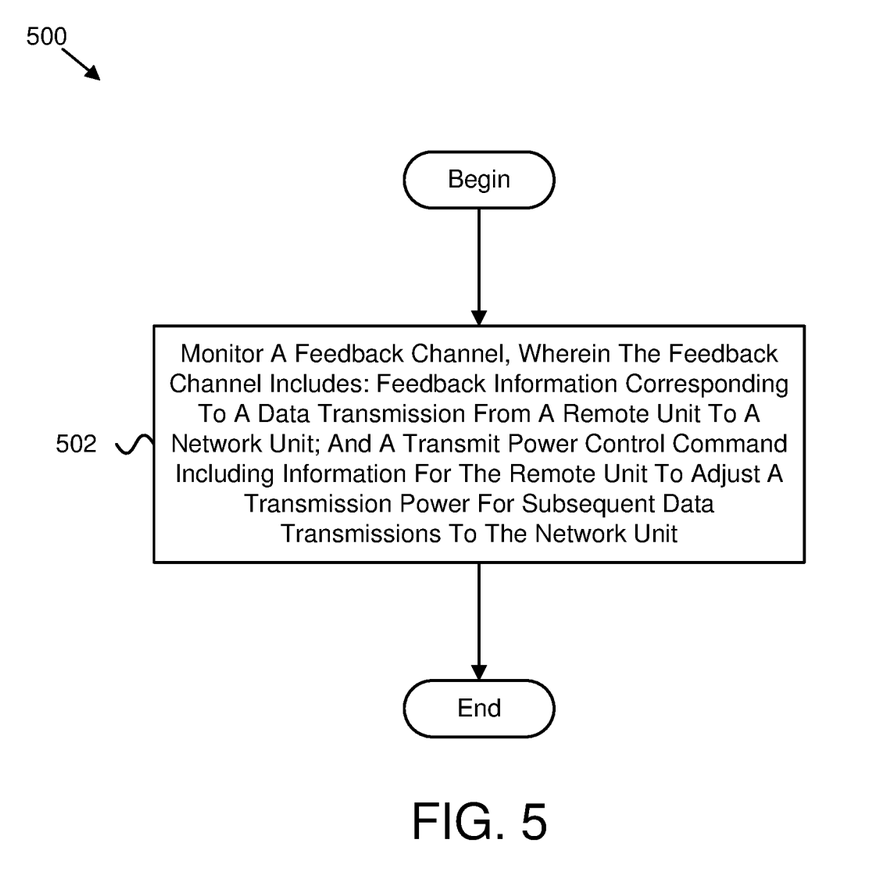
FIG. 5 is a flow chart diagram illustrating one embodiment of a method for receiving a TPC command for transmission power adjustment.

FIG. 5 is a flow chart diagram illustrating one embodiment of a method 500 for receiving a TPC command for transmission power adjustment. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include monitoring 502 a feedback channel. In some embodiments, the feedback channel includes: feedback information corresponding to a data transmission from a remote unit 102 to a network unit 104; and a transmit power control command including information for the remote unit 102 to adjust a transmission power for subsequent data transmissions to the network unit 104.

In certain embodiments, the method 500 includes adjusting the transmission power based on the transmit power control command. In some embodiments, the transmission power control command indicates a transmission power step up, a transmission power step down, or a combination thereof.

In various embodiments, the transmit power control command has a size of 1 bit. In one embodiment, the 1 bit indicates a transmission power step up or a transmission power step down.

In certain embodiments, the transmit power control command has a size of 2 bits. In some embodiments, the 2 bits indicate at least one transmission power step up and at least one transmission power step down.

In various embodiments, the method 500 includes performing a transmission power step up in response to not receiving acknowledgement of the previous data transmission within a predetermined time period after the previous data transmission. In one embodiment, the method 500 includes performing a transmission power step up in response to being unable to detect the feedback channel within a predetermined time period after a preceding autonomous uplink transmission. In certain embodiments, the method 500 includes transmitting the data transmission from the remote unit 102 to the network unit 104.

Figure 6:
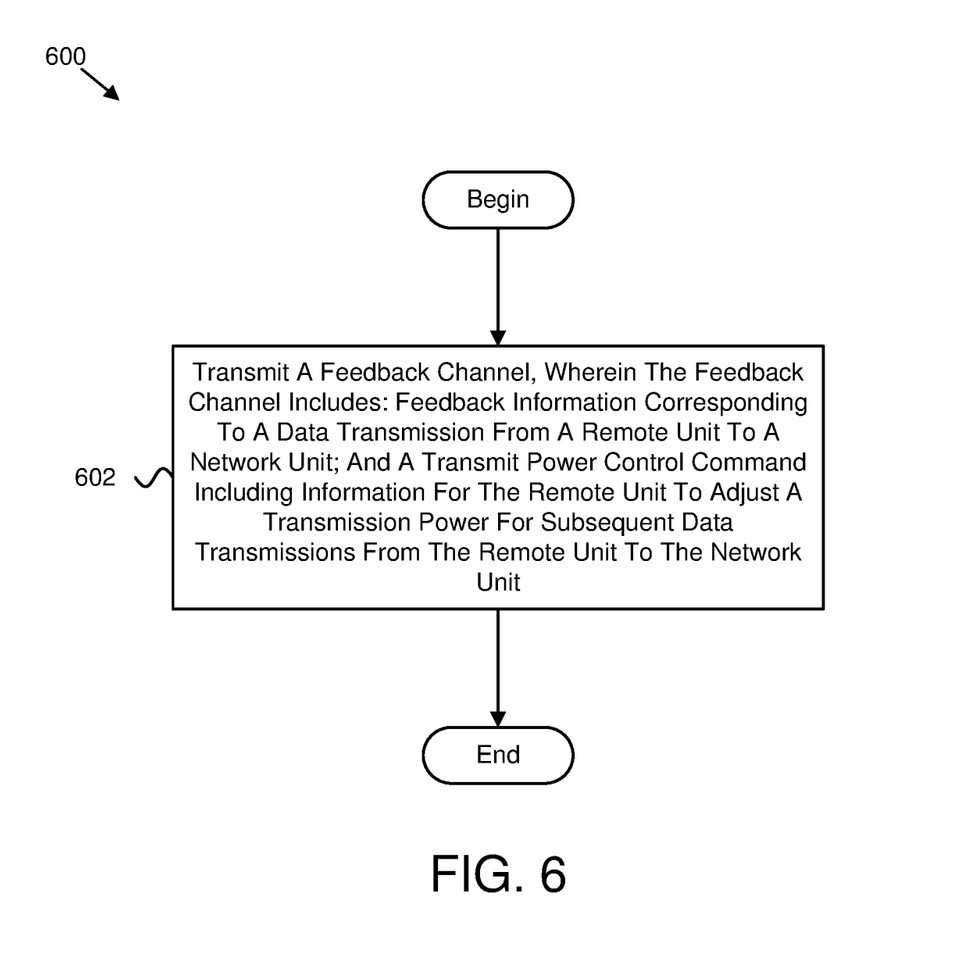
FIG. 6 is a flow chart diagram illustrating one embodiment of a method for transmitting a TPC command for transmission power adjustment.

FIG. 6 is a flow chart diagram illustrating one embodiment of a method 600 for transmitting a TPC command for transmission power adjustment. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 a feedback channel. In some embodiments, the feedback channel includes: feedback information corresponding to a data transmission from a remote unit 102 to a network unit 104; and a transmit power control command including information for the remote unit 102 to adjust a transmission power for subsequent data transmissions to the network unit 104.

In one embodiment, the transmission power control command indicates a transmission power step up, a transmission power step down, or a combination thereof. In certain embodiments, the transmit power control command has a size of 1 bit. In some embodiments, the 1 bit indicates a transmission power step up or a transmission power step down.

In various embodiments, the transmit power control command has a size of 2 bits. In one embodiment, the 2 bits indicate at least one transmission power step up and at least one transmission power step down. In certain embodiments, the method 600 includes receiving the data transmission from the remote unit 102.

In one embodiment, a method comprises: monitoring a feedback channel, wherein the feedback channel comprises: feedback information corresponding to a data transmission from a remote unit to a network unit; and a transmit power control command comprising information for the remote unit to adjust a transmission power for subsequent data transmissions to the network unit.

In certain embodiments, the method comprises adjusting the transmission power based on the transmit power control command.

In some embodiments, the transmission power control command indicates a transmission power step up, a transmission power step down, or a combination thereof.

In various embodiments, the transmit power control command has a size of 1 bit.

In one embodiment, the 1 bit indicates a transmission power step up or a transmission power step down.

In certain embodiments, the transmit power control command has a size of 2 bits.

In some embodiments, the 2 bits indicates a transmission power step up, a transmission power step down, no change in a transmission power, or some combination thereof.

In various embodiments, the method comprises performing a transmission power step up in response to not receiving acknowledgement of the previous data transmission within a predetermined time period after the previous data transmission.

In one embodiment, the method comprises performing a transmission power step up in response to being unable to detect the feedback channel within a predetermined time period after a preceding autonomous uplink transmission.

In certain embodiments, the method comprises transmitting the data transmission from the remote unit to the network unit.

In one embodiment, an apparatus comprises: a processor that monitors a feedback channel, wherein the feedback channel comprises: feedback information corresponding to a data transmission from the apparatus to a network unit; and a transmit power control command comprising information for the apparatus to adjust a transmission power for subsequent data transmissions to the network unit.

In certain embodiments, the processor adjusts the transmission power based on the transmit power control command.

In some embodiments, the transmission power control command indicates a transmission power step up, a transmission power step down, or a combination thereof.

In various embodiments, the transmit power control command has a size of 1 bit.

In one embodiment, the 1 bit indicates a transmission power step up or a transmission power step down.

In certain embodiments, the transmit power control command has a size of 2 bits.

In some embodiments, the 2 bits indicates a transmission power step up, a transmission power step down, no change in a transmission power, or some combination thereof.

In various embodiments, the processor performs a transmission power step up in response to not receiving acknowledgement of the previous data transmission within a predetermined time period after the previous data transmission.

In one embodiment, the processor performs a transmission power step up in response to being unable to detect the feedback channel within a predetermined time period after a preceding autonomous uplink transmission.

In certain embodiments, the apparatus comprises a transmitter that transmits the data transmission from the apparatus to the network unit.

In one embodiment, a method comprises: transmitting a feedback channel, wherein the feedback channel comprises: feedback information corresponding to a data transmission from a remote unit to a network unit; and a transmit power control command comprising information for the remote unit to adjust a transmission power for subsequent data transmissions from the remote unit to the network unit.

In certain embodiments, the transmission power control command indicates a transmission power step up, a transmission power step down, or a combination thereof.

In some embodiments, the transmit power control command has a size of 1 bit.

In various embodiments, the 1 bit indicates a transmission power step up or a transmission power step down.

In one embodiment, the transmit power control command has a size of 2 bits.

In certain embodiments, the 2 bits indicate a transmission power step up, a transmission power step down, no change in a transmission power, or some combination thereof.

In some embodiments, the method comprises receiving the data transmission from the remote unit.

In one embodiment, an apparatus comprises: a transmitter that transmits a feedback channel, wherein the feedback channel comprises: feedback information corresponding to a data transmission from a remote unit to the apparatus; and a transmit power control command comprising information for the remote unit to adjust a transmission power for subsequent data transmissions from the remote unit to the apparatus.

In certain embodiments, the transmission power control command indicates a transmission power step up, a transmission power step down, or a combination thereof.

In some embodiments, the transmit power control command has a size of 1 bit.

In various embodiments, the 1 bit indicates a transmission power step up or a transmission power step down.

In one embodiment, the transmit power control command has a size of 2 bits.

In certain embodiments, the 2 bits indicate a transmission power step up, a transmission power step down, no change in a transmission power, or some combination thereof.

In some embodiments, the apparatus comprises a receiver that receives the data transmission from the remote unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   monitoring a hybrid automatic repeat request feedback channel, wherein:
      the hybrid automatic repeat request feedback channel comprises both of hybrid automatic repeat request feedback information for a plurality of hybrid automatic repeat request processes and a single transmit power control command that corresponds to all hybrid automatic repeat request processes of the plurality of hybrid automatic repeat request processes;
      the hybrid automatic repeat request feedback information corresponds to at least one data transmission from a remote unit to a network unit;
      the transmit power control command comprises information for the remote unit to adjust a transmission power for subsequent data transmissions to the network unit; and
      the hybrid automatic repeat request feedback information is different from the transmit power control command.

2. The method of claim 1, wherein the transmission power control command indicates a transmission power step up, a transmission power step down, or a combination thereof.

3. An apparatus comprising:
   a processor that monitors a hybrid automatic repeat request feedback channel, wherein:

the hybrid automatic repeat request feedback channel comprises both of hybrid automatic repeat request feedback information for a plurality of hybrid automatic repeat request processes and a single transmit power control command that corresponds to all hybrid automatic repeat request processes of the plurality of hybrid automatic repeat request processes;

the hybrid automatic repeat request feedback information corresponds to at least one data transmission from the apparatus to a network unit;

the transmit power control command comprises information for the apparatus to adjust a transmission power for subsequent data transmissions to the network unit; and the hybrid automatic repeat request feedback information is different from the transmit power control command.

4. The apparatus of claim 3, wherein the processor adjusts the transmission power based on the transmit power control command.

5. The apparatus of claim 3, wherein the transmit power control command has a size of 1 bit.

6. The apparatus of claim 5, wherein the 1 bit indicates a transmission power step up or a transmission power step down.

7. The apparatus of claim 3, wherein the transmit power control command has a size of 2 bits.

8. The apparatus of claim 7, wherein the 2 bits indicate a transmission power step up, a transmission power step down, no change in a transmission power, or some combination thereof.

9. The apparatus of claim 3, wherein the processor performs a transmission power step up in response to not receiving acknowledgement of a previous data transmission within a predetermined time period after the previous data transmission.

10. The apparatus of claim 3, wherein the processor performs a transmission power step up in response to being unable to detect the feedback channel within a predetermined time period after a preceding autonomous uplink transmission.

11. The apparatus of claim 3, further comprising a transmitter that transmits the at least one data transmission from the apparatus to the network unit.

12. A method comprising:
transmitting a hybrid automatic repeat request feedback channel, wherein:
the hybrid automatic repeat request feedback channel comprises both of hybrid automatic repeat request feedback information for a plurality of hybrid automatic repeat request processes and a single transmit power control command that corresponds to all hybrid automatic repeat request processes of the plurality of hybrid automatic repeat request processes;

the hybrid automatic repeat request feedback information corresponds to at least one data transmission from a remote unit to a network unit;

the transmit power control command comprises information for the remote unit to adjust a transmission power for subsequent data transmissions from the remote unit to the network unit; and the hybrid automatic repeat request feedback information is different from the transmit power control command.

13. The method of claim 12, wherein the transmission power control command indicates a transmission power step up, a transmission power step down, or a combination thereof.

14. The method of claim 12, further comprising receiving the at least one data transmission from the remote unit.

15. An apparatus comprising:
a transmitter that transmits a hybrid automatic repeat request feedback channel, wherein:
the hybrid automatic repeat request feedback channel comprises both of hybrid automatic repeat request feedback information for a plurality of hybrid automatic repeat request processes and a single transmit power control command that corresponds to all hybrid automatic repeat request processes of the plurality of hybrid automatic repeat request processes;

the hybrid automatic repeat request feedback information corresponds to at least one data transmission from a remote unit to the apparatus;

the transmit power control command comprising information for the remote unit to adjust a transmission power for subsequent data transmissions from the remote unit to the apparatus; and the hybrid automatic repeat request feedback information is different from the transmit power control command.

16. The apparatus of claim 15, wherein the transmit power control command has a size of 1 bit.

17. The apparatus of claim 16, wherein the 1 bit indicates a transmission power step up or a transmission power step down.

18. The apparatus of claim 15, wherein the transmit power control command has a size of 2 bits.

19. The apparatus of claim 18, wherein the 2 bits indicate a transmission power step up, a transmission power step down, no change in a transmission power, or some combination thereof.

20. The apparatus of claim 15, further comprising a receiver that receives the at least one data transmission from the remote unit.

* * * * *